(12) United States Patent
Hamada et al.

(10) Patent No.: US 7,740,978 B2
(45) Date of Patent: Jun. 22, 2010

(54) BATTERY PACK

(75) Inventors: Shinji Hamada, Toyohashi (JP); Takashi Asahina, Toyohashi (JP); Yoshitaka Sunagawa, Toyohashi (JP); Toyohiko Eto, Toyota (JP)

(73) Assignees: Panasonic Corporation, Osaka (JP); Toyota Jidosha Kabushiki Kaisha, Aichi (JP)

( * ) Notice: Subject to any disclaimer, the term of this patent is extended or adjusted under 35 U.S.C. 154(b) by 1260 days.

(21) Appl. No.: 10/556,137

(22) PCT Filed: May 21, 2004

(86) PCT No.: PCT/JP2004/007398

§ 371 (c)(1), (2), (4) Date: Nov. 9, 2005

(87) PCT Pub. No.: WO2004/112172

PCT Pub. Date: Dec. 23, 2004

(65) Prior Publication Data

US 2006/0246348 A1 Nov. 2, 2006

(30) Foreign Application Priority Data

Jun. 13, 2003 (JP) .............................. 2003-168575

(51) Int. Cl.
*H01M 2/10* (2006.01)
*H01M 10/50* (2006.01)
*H01M 6/42* (2006.01)
*H01M 2/12* (2006.01)

(52) U.S. Cl. .......................... 429/100; 429/71; 429/99; 429/120; 429/159

(58) Field of Classification Search ............ 429/96–100
See application file for complete search history.

(56) References Cited

U.S. PATENT DOCUMENTS

| | | | |
|---|---|---|---|
| 5,766,801 | A | 6/1998 | Inoue et al. |
| 5,879,833 | A | 3/1999 | Yoshii et al. |
| 6,326,103 | B1 * | 12/2001 | Ido et al. .................... 429/156 |
| 6,818,343 | B1 | 11/2004 | Kimoto et al. |
| 6,953,638 | B2 | 10/2005 | Inui et al. |

(Continued)

FOREIGN PATENT DOCUMENTS

CN      1236191      11/1999

(Continued)

OTHER PUBLICATIONS

English language translation CN 2450785 Y.

(Continued)

*Primary Examiner*—Dah-Wei D Yuan
*Assistant Examiner*—Maria J Laios
(74) *Attorney, Agent, or Firm*—Greenblum & Bernstein P.L.C.

(57) ABSTRACT

The battery pack uses a restraining tool capable of secure restraint despite relatively low rigidity to achieve weight and cost reductions. The battery pack is formed of a plurality of parallel arranged battery modules (2), each consisting of a plurality of cells (5) electrically connected in series and coupled together in one piece with gaps (8) formed therebetween (5, 5), each cell being formed of elements for electromotive force encased in a prismatic case. The restraining tool includes connecting members (4) extending through the gaps (8) at both ends of the parallel arranged battery modules (2) and between two given cells (5, 5).

18 Claims, 7 Drawing Sheets

U.S. PATENT DOCUMENTS

2002/0051340 A1     5/2002    Oda et al.
2003/0211384 A1*   11/2003   Hamada et al. ............ 429/120

FOREIGN PATENT DOCUMENTS

| | | |
|---|---|---|
| CN | 2450785 | 9/2001 |
| CN | 1328705 | 12/2001 |
| EP | 0771038 | 5/1997 |
| EP | 1178558 | 2/2002 |
| JP | 10-021891 | 1/1998 |
| JP | 11-126585 | 5/1999 |
| JP | 2000-48867 | 2/2000 |
| JP | 2000-067833 | 3/2000 |
| JP | 2000-090976 | 3/2000 |
| JP | 2000-301954 | 10/2000 |
| JP | 2000-323109 | 11/2000 |
| JP | 2001-068081 | 3/2001 |
| JP | 2001-155789 | 6/2001 |
| JP | 2001-185103 | 6/2001 |
| JP | 2001-507856 | 6/2001 |
| JP | 2001-256949 | 9/2001 |
| JP | 2001-268717 | 9/2001 |
| JP | 2001-283937 | 10/2001 |
| WO | 98/31059 | 7/1998 |

OTHER PUBLICATIONS

English Language Abstract of JP 11-126585.
English Language Abstract of JP 2001507856.
English Language Abstract of JP 2001-185103.
English Language Abstract of JP 2001-068081.
English Language Abstract of JP 2001-256949.
English Language Abstract of JP 2001-155789.
English Language Abstract of JP 2000-323109.
English Language Abstract of JP 2000-302954.
English Language Abstract of JP 2000-090976.
English Language Abstract of JP 2000-067833.
English Language Abstract of JP 10-021891.
U.S. Appl. No. 10/544,766, filed Aug. 8, 2005.
U.S. Appl. No. 10/544,767, filed Aug. 8, 2005.
U.S. Appl. No. 10/556,131, filed Nov. 9, 2005.
English language Abstract of JP 2001-283937, Oct. 12, 2001.
English language Abstract of JP 2000-48867, Feb. 18, 2000.
English language Abstract of JP 2001-268717, Sep. 28, 2001.
English Language Abstract of JP 2000-301954.

* cited by examiner

BATTERY PACK

TECHNICAL FIELD

The present invention relates to a battery pack formed of a plurality of parallel arranged battery modules, each battery module consisting of a plurality of series-connected cells.

BACKGROUND ART

There have been known battery packs having large power capacity, in which a plurality of prismatic cells, or battery modules, each consisting of a plurality of cells connected in series and coupled together in one piece, are arranged parallel with insulating spacers interposed therebetween. End plates are arranged at both ends in the direction of alignment of the cells or battery modules and tightly fastened with a restraining rod or a band, so as to prevent expansion of side faces of the cells or battery modules due to internal pressure of batteries. The cells or battery modules are connected either in series or in parallel (see, for example, Japanese Patent Laid-Open Publication No. 11-126585 and Published Japanese Translation No. 2001-507856 of PCT International Application).

In a battery pack of the above configuration, however, the end plates, as a restraining tool, need to have a rigidity that is high enough to withstand the internal pressure of the prismatic cells or the expansion of battery electrode plates, and in order to increase the rigidity, the end plates tend to be heavy and large, causing an increase in the weight and cost of the battery pack.

In view of the above problem in the conventional technique, it is an object of the present invention to provide a battery pack having a lighter restraining tool for achieving weight and cost reductions of the battery pack.

DISCLOSURE OF THE INVENTION

A battery pack according to a first aspect of the present invention includes a plurality of parallel arranged battery modules, each battery module consisting of a plurality of cells formed by encasing elements for electromotive force in prismatic cases, the cells being electrically connected in series and coupled together in one piece with gaps formed therebetween, and a restraining tool having connecting members extending through the gaps at both ends of the parallel arranged battery modules and between two given cells.

With this configuration, expansion of the cases due to internal pressure of the cells or expansion of the elements for electromotive force is restrained by tension of the connecting members extending through the gaps at both ends of the battery modules and between two given cells in the middle of the battery module. The battery pack is therefore securely restrained with use of a restraining tool having relatively low rigidity, and accordingly weight and cost reductions of the battery pack are achieved.

A connection terminal for electrically connecting the cells with each other may be protruded on at least one of opposing side faces of the cells such as to form gaps between the opposing side faces of the cells that make up the battery module. The individual cells then need only be connected using connection terminals to obtain a battery module in which gaps are formed between the cells. The battery modules are therefore manufactured with good productivity.

Between the parallel arranged battery modules may be provided components for forming cooling medium passages between side faces of the cells. The cells of the battery modules are then cooled effectively from their side faces by the cooling medium flowing through the cooling medium passages, whereby deterioration of battery characteristics due to a temperature rise is prevented. Such components for forming cooling medium passages should preferably be disposed between the long side faces of the cells to achieve high cooling effect.

Preferably, the restraining tool includes end plates arranged at both ends in the alignment direction of the battery modules, and both ends of the connecting members are coupled to the end plates, so that the battery modules are restrained uniformly over the entire surface by the end plates.

The components forming the cooling medium passages may be provided on the cases of the cells, but should preferably be formed of separate spacer portions independently of the battery modules so that they are made of a suitably selected material. The cell case configuration is then made simple and the cells are produced at lower cost, leading to an overall cost reduction.

The cell cases are preferably made of a metal and the components forming the cooling medium passages are insulating spacer portions provided independently of the battery modules, so that insulation between the battery modules consisting of cells encased in metal cases is achieved by interposing the insulating spacer portions therebetween.

The spacer portions may have holder portions that fit in the gaps between the cells for positioning the cells, so that relative positions of the cells of each battery module are restricted by the spacer portions, whereby the battery pack is rigidly assembled and safety features of the battery pack under severe use conditions such as when mounted on a vehicle are improved.

A battery pack according to a second aspect of the present invention includes a plurality of parallel arranged battery modules, each battery module consisting of a plurality of cells formed by encasing elements for electromotive force in prismatic cases, the cells being electrically connected with each other in series by connection terminals protruded on their side faces, holders for the battery modules disposed between parallel arranged adjacent battery modules, end plates arranged at both ends in the alignment direction of the battery modules, and connecting members extending through the gaps at both ends of the battery modules and between two given cells and coupling both end plates together, wherein each holder includes a spacer portion forming a cooling medium passage between side faces of the cells and holder portions provided on both sides of the spacer portion at locations corresponding to both sides of each cell for engaging with and retaining the cells.

With this configuration, the same effects as the battery pack according to the first aspect of the invention described above are achieved. Moreover, because the battery module with the holder retaining each of the cells is obtained by fitting the battery module in the holder or by connecting the connection terminals using the holder to hold the cells, the battery pack is assembled with good productivity simply by arranging these holders in parallel, with the end plates provided at both ends, and by coupling them together with the connecting members.

The connection terminals of the cells are preferably protruded on short side faces of the cell cases, and the cooling medium passages are formed between the long side faces of the cells, so as to achieve effective cooling of the cells from their long side faces and to prevent deterioration of battery characteristics due to a temperature rise.

The holder portions of the holders should preferably engage with generally half or less of the width of the short side faces of the cells to securely retain the cells by the holders.

The cell cases are preferably made of a metal and the holders are made of an insulating material, so that insulation between the battery modules consisting of cells encased in metal cases is achieved by interposing the insulating spacer portions therebetween.

The holder may include support portions at both ends, which are placed on support members, at least one of the support portions being provided with a fixing bolt hole or screw hole, so that the battery pack is readily and firmly installed by placing the support portions at both ends of the holders on the support members and by fastening with bolts.

The support portions at both ends of the holders may be formed with an engaging protrusion on one side and an engaging recess on the other side in which the engaging protrusion fits. When connecting the battery modules sequentially in series to form the battery pack, the holders are arranged parallel in alternate directions and the connection terminals at both ends of adjacent battery modules are connected. In this process, only one end of the holder needs to be fixed using a bolt, because the other end of the holder is fixedly retained between the support portions of the holders on both sides by the engagement between the engaging protrusions and engaging recesses. Thus, while secure support of both ends of the holders is achieved, the number of the bolts is reduced by half, leading to weight and cost reductions.

The holder portions of the holders may include support projections on the top and the bottom, which are engaged with an upper case and a lower case covering the battery pack. The battery modules are thus supported by the upper and lower cases covering the battery pack via the holders, and, such support projections form spaces for supply and discharge of cooling medium between the top of the holders and the upper case and between the bottom of the holders and the lower case.

In the above configuration, the connecting members are preferably arranged on both sides of each of the cells of the battery modules, so that the end plates are restrained at both sides of each cell, whereby the rigidity of the end plates is made lower, leading to weight and size reductions.

Heat dissipation fins forming the cooling medium passages may be provided on the long side faces of the cells to enhance the cell cooling performance.

The spacer portions may have projections that abut on the long side faces of the cells to form the cooling medium passages, so that cooling medium passages are formed between the battery modules with a simple and inexpensive configuration.

Heat dissipation fins facing the cooling medium passages may be provided on the long side faces of the cells to enhance the cell cooling performance.

Such heat dissipation fins may be fixed on the long side faces of the cells, but also may be resiliently pressed against the long side faces of the cells by pressure applied from the spacer portions forming the cooling medium passages, so that desired cooling effect is achieved without the process of fixing the heat dissipation fins on the long side faces of the cells.

BEST MODE FOR CARRYING OUT THE INVENTION

Figure 1:
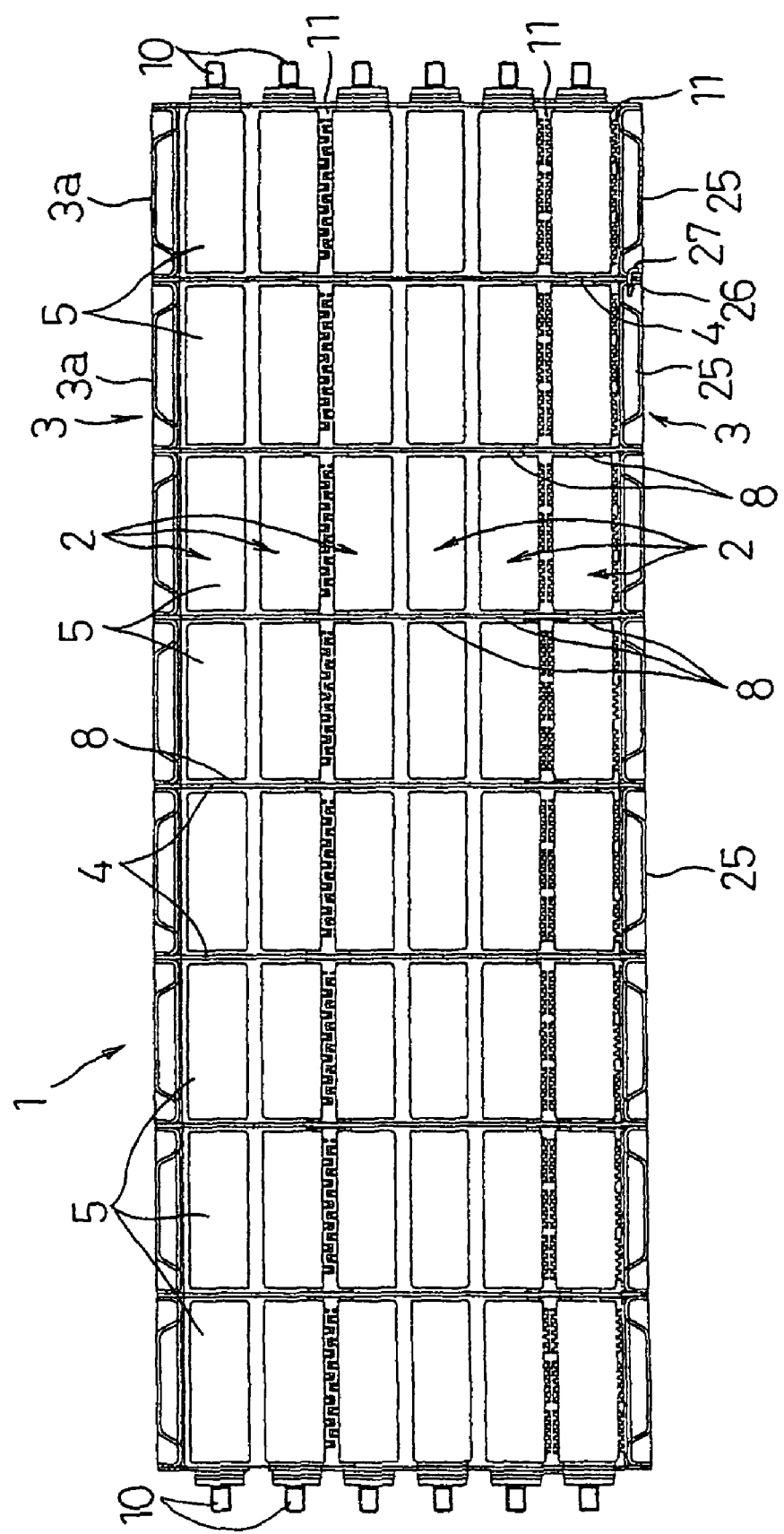
FIG. 1 is a cross-sectional plan view of one embodiment of a battery pack of the present invention.
Figure 2:
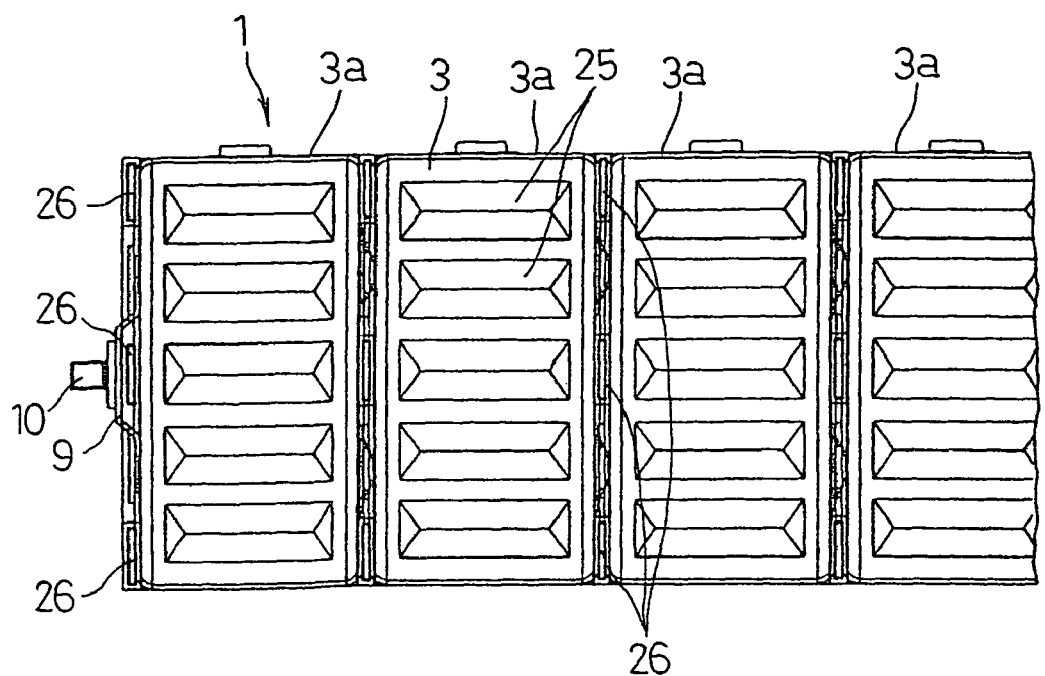
FIG. 2 is a partial front view of the same embodiment of the battery pack.

One embodiment of the battery pack of the present invention will be hereinafter described with reference to FIG. 1 to FIG. 7 and FIG. 9.

In FIG. 1 to FIG. 4, 1 denotes a battery pack used as a drive power source of electric vehicles including electric vehicles, hybrid vehicles or the like driven by fuel batteries. A plurality of (six in the illustrated example) battery modules 2 are arranged in parallel, and end plates 3 are arranged at both ends in the parallel alignment direction of the battery modules 2. The end plates 3 are coupled together using a plurality of plate strips or connecting members 4 (three each at nine locations in the illustrated example).

The battery module 2 consists of a plurality of (eight in the illustrated example) cells 5. Each cell 5 is formed by accommodating elements for electromotive force consisting of laminated positive and negative electrode plates with separators interposed therebetween and liquid electrolyte in a prismatic metal case. A current collector of one polarity extending from the electrode plates is connected to the case, and the current collector of the other polarity is connected to a pair of connection terminals 6 extending through one short side face of the case in an insulated manner. Corresponding connection terminals 7 protrude from the other short side face of the case opposite the short side face formed with the connection terminals 6.

Figure 9:
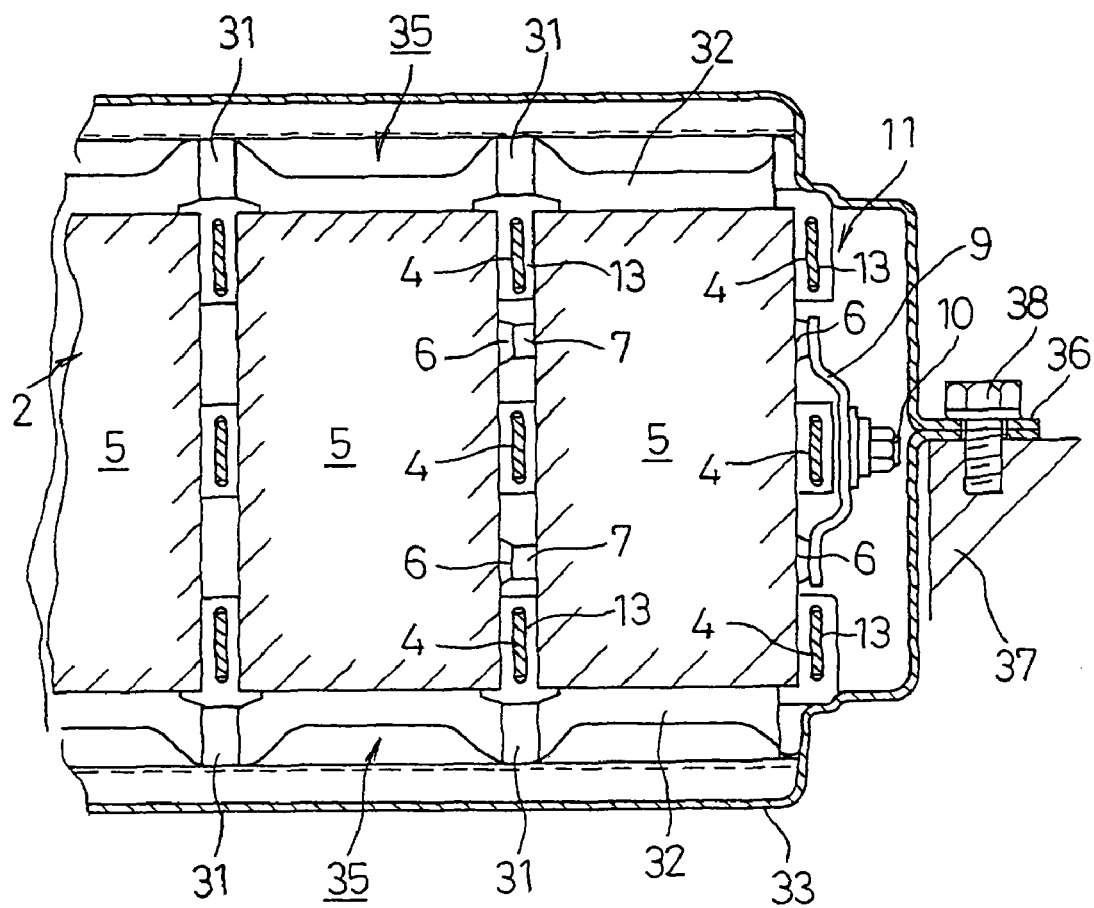
FIG. 9 is a longitudinal cross-sectional front view showing part of the same embodiment.

These cells 5 are coupled together and electrically connected in series with each other by joining the pairs of positive and negative connection terminals 6 and 7 respectively protruded on both short side faces by laser beam welding or electron beam welding to form the battery module 2, as shown in FIG. 9. Thus, there is formed a gap 8 between each two adjacent cells 5 of the battery module 2 except for the portions where the connection terminals 6 and 7 are provided. The pair of connection terminals 6 on the outer short side face at one end of the battery module 2 are joined to both ends of a connection plate 9 formed with a protruding electrode pole 10 in the center by laser beam welding or electron beam welding. The same applies to the connection terminals 7 on the outer short side face at the other end of the battery module 2.

Figure 4:
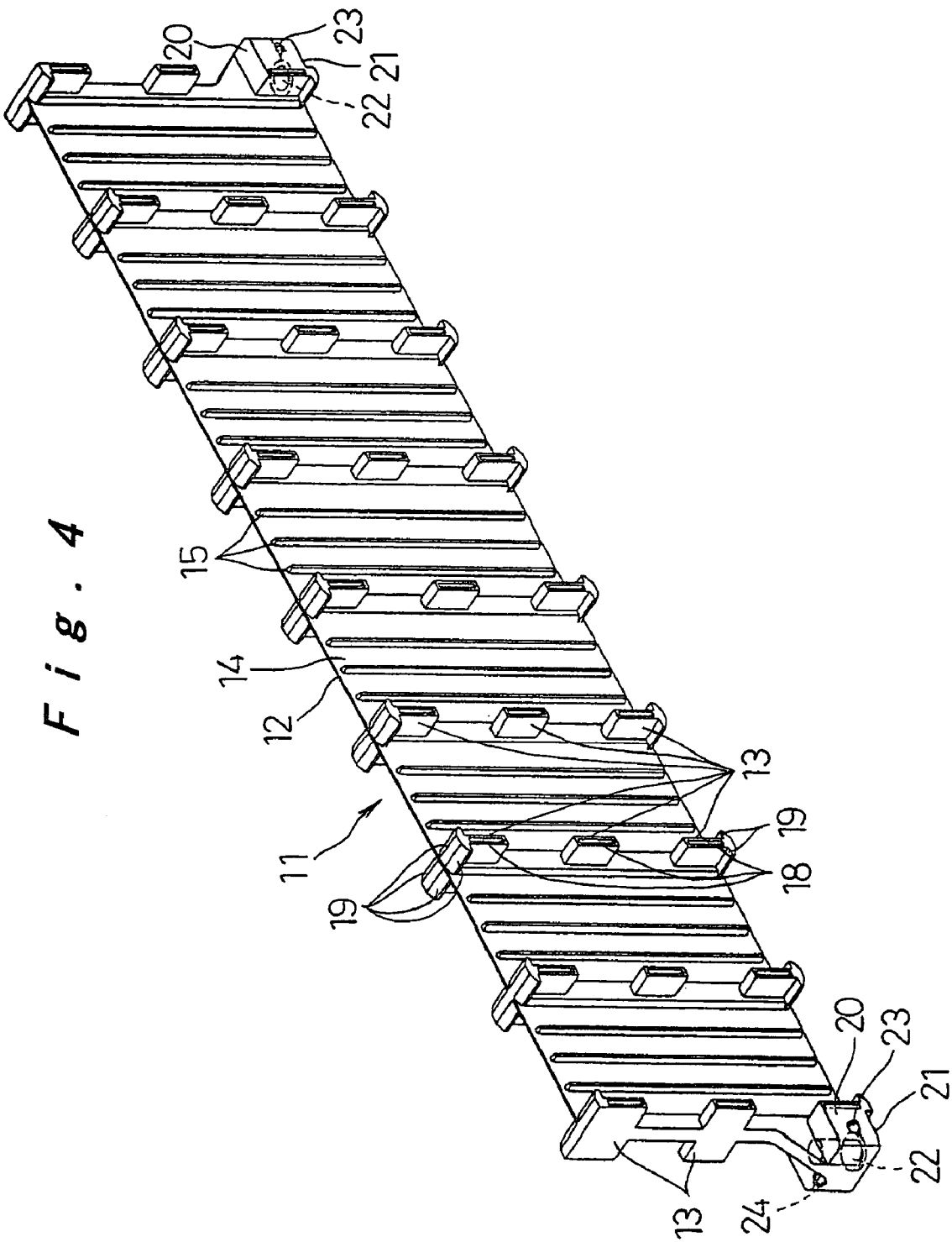
FIG. 4 is a perspective view of a holder in the same embodiment.

Between the battery modules 2 and between the battery modules 2 and the end plates 3 are provided holders 11 for holding the battery modules 2. The holder 11 is a synthetic resin molded component having electrical insulation properties, and includes, as shown in FIG. 4, a spacer portion 12 that forms cooling medium passages between the long side faces of the cells 5, and holder portions 13 provided on one or both sides of the spacer portion 12 at positions corresponding to both sides of each of the cells 5 for holding the cells 5. The holder portions 13 are formed on both sides of the spacer portion 12 in the holders 11 that are arranged between the battery modules 2, while the holder portions are formed on one side in the holders 11 that are arranged between the battery modules 2 and the end plates 3.

The spacer portion 12 is formed of a relatively thin connection plate 14 extending over the entire surface of the holder 11 and a plurality of appropriately spaced protrusions 15 extending in an up and down direction on both sides of the connection plate 14 such that their top faces abut on the long side faces of the cells 5. The cooling medium passages 16 are formed by the space made by these protrusions 15 between the connection plate 14 and the long side faces of the cells 5. The interval between the protrusions 15 is set such that expansion of the long side faces of the cells 5 is prevented effectively.

Figure 3:
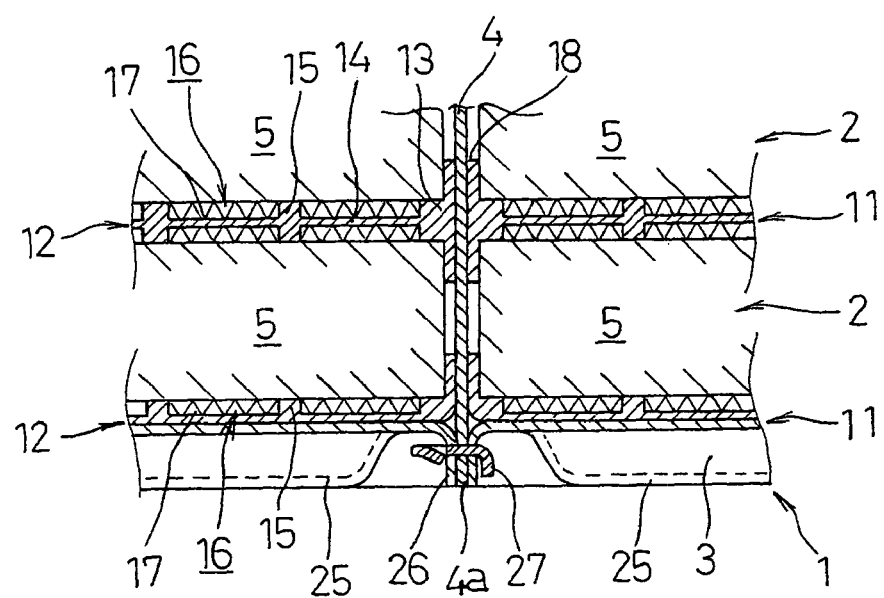
FIG. 3 is a cross-sectional plan view enlarging part of the same embodiment of the battery pack.

Within the cooling medium passages 16, as shown in FIG. 3, corrugated or continuously ridged heat dissipation fins 17 fixed to the long side faces of the cells 5 by welding or the like are arranged, so that heat generated in the cells 5 is efficiently conducted to the cooling medium flowing through the cooling medium passages 16. The heat dissipation fins 17 need not necessarily be fixed to the long side faces of the cells 5 and may only make resilient contact therewith by pressure from the connection plate 14, whereby the production cost for the cases of the cells 5 is reduced.

The holder portions 13 protrude to fit in the gaps 8 between the cells 5 and to engage with generally half or less of the width of the short side faces of the cells 5, as shown in FIG. 3. In the illustrated example, the holder portions 13 are provided at three locations, in the upper and lower parts of the connection plate 14 and in the middle between the pairs of connection terminals 6 and 7. Through holes 18 are formed in the cross-sectional center of the holder portions 13 for retaining the connecting members 4 extending therethrough. The upper and lower holder portions 13 include flanges 19 extending from the upper and lower ends for engaging with the upper and lower end faces of the cells 5. Not to mention, the holder portions 13 at both ends of the holder 11 are designed to engage with the outer short side faces and upper and lower end faces of the cells 5 at both ends.

The holder 11 is provided with support portions 20 in the lower part at both ends. The support portion 20 includes an installation surface 21 that is placed on a support member (not shown) in engagement therewith and a fixing screw hole 22 formed by insert-molding a nut member. The screw hole 22 may be replaced with a bolt hole. The support portions 20 at both ends of the holder 11 respectively include an engaging protrusion 23 on one side and an engaging recess 24 on the other side in which the engaging protrusion 23 fits.

The end plate 3 is a press-formed thin steel plate and divided in blocks 3a corresponding to each of the cells 5 in the illustrated example. Each block 3a is provided with a plurality of reinforcing beads 25 for securing surface strength and rigidity. The ends 4a of the connecting member 4 are fitted in sheath portions 26 provided on both sides of each block 3a. The sheath portion 26 and the ends 4a of the connecting member 4 are fixed by wedge members 27 or rivets piercing through these.

According to the battery pack 1 of the above configuration, since the end plates 3 are coupled together with connecting members 4 extending through the gaps 8 formed at both ends of the battery modules 2 and between each two cells 5, expansion of the long side faces of the cases due to internal pressure of the cells 5 and expansion of the elements for electromotive force is surely restrained by the lightweight and inexpensive end plates 3, which have relatively low rigidity. Accordingly the weight and cost of the battery pack 1 are reduced. Further, even though the plurality of battery modules 2 are arranged in parallel and restrained, the cooling medium passages 16 formed by the spacer portions 12 of the holders 11 interposed between adjacent battery modules 2 enable effective cooling of the cells 5 from their long side faces and prevent deterioration of battery characteristics caused by a temperature rise.

As the cooling medium passages 16 are formed by the spacer portions 12 provided separately from the cell cases, the case configuration of the cell 5 is made simple and the case is produced at low cost. Moreover, as the spacer portions 12 have electrical insulation properties, insulation between the battery modules consisting of cells 5 accommodated in metal cases is securely achieved.

The holder portions 13 of the holders 11 restrict the relative positions of each of the cells 5 of the battery modules 2, whereby the battery pack 1 is rigidly assembled and safety features of the battery pack 1 under severe use conditions such as when mounted on a vehicle are improved.

The battery modules 2 retained in the holders 11 are obtained by fitting the battery modules 2 in the holders 11 or by connecting the connection terminals 6 and 7 using the holder 11 to hold the cells 5. The battery pack is thus assembled with good productivity simply by arranging these holders 11 in parallel, with the end plates 3 provided at both ends, and by coupling them together by the connecting members 4.

The holders 11 are fixedly fastened by placing the installation surfaces 21 of the support portions 20 at both ends on the support members (not shown) and by screwing bolts in the screw holes 22, whereby the battery pack 1 is readily assembled and firmly installed. When connecting the battery modules 2 sequentially in series to form the battery pack 1, the holders 11 are arranged parallel in alternate directions and the electrode poles 10 at both ends of adjacent battery modules 2 are connected. In this process, only one end of the holder 11 needs to be fixed using a bolt, because the other end of the holder 11 is fixedly retained between the support portions 20 of the holders 11 on both sides by the engagement between the engaging protrusions 23 and engaging recesses 24 on both side faces of the support portions 20. Thus, while secure support of both ends of the holders 11 is achieved, the number of the bolts is reduced by half, leading to weight and cost reductions.

The protrusions 15 on the connection plate 14 of the spacer portion 12 enable the formation of the cooling medium passages 16 between the battery modules 2 with a simple and inexpensive configuration. Moreover, the heat dissipation fins 17 facing the cooling medium passages 16 and disposed on the long side faces of the cells 5 improve the cell cooling performance.

The heat dissipation fins 17 may be resiliently pressed against the long side faces of the cells 5 by pressure applied from the connection plate 14 of the spacer portion 12, so that desired cooling effect is achieved with a less expensive configuration by obviating the need of fixing the heat dissipation fins 17 on the long side faces of the cells 5.

Figure 5:
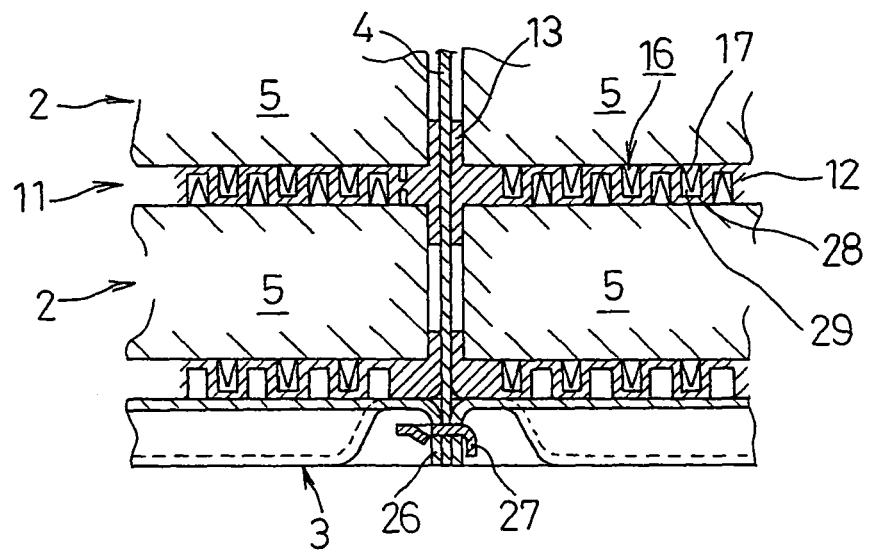
FIG. 5 is a cross-sectional plan view enlarging part of a first modified example of the same embodiment.
Figure 6:
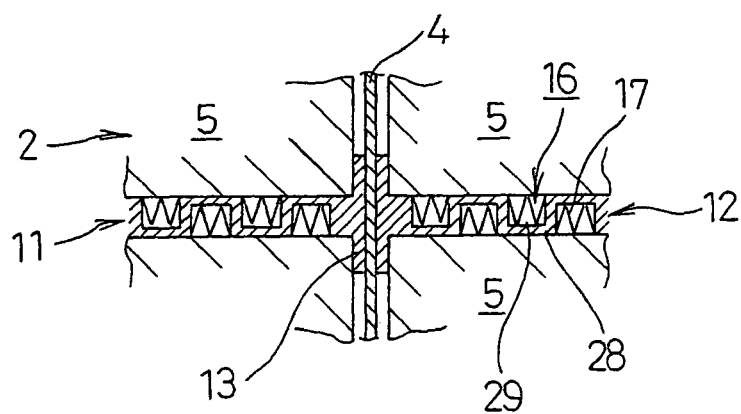
FIG. 6 is a cross-sectional plan view enlarging part of a second modified example of the same embodiment.

While the holder 11 described above is formed of a spacer portion 12 having the flat connection plate 14 and protrusions 15 on both sides of the connection plate to form the cooling medium passages 16, the spacer portion 12 may be formed of a connection plate 28 having a square wave cross section as shown in FIG. 5, the square grooves 29 forming the cooling medium passages 16 and accommodating heat dissipation fins 17 fixed on the long side faces of the cells 5. While a single ridged heat dissipation fin 17 is respectively accommodated in each of the square grooves 29 of the example in FIG. 5, the square wave may have a larger width so that a plurality of ridged heat dissipation fins 17 may be accommodated in each square groove 29 as shown in FIG. 6. The heat dissipation fins 17 need not be fixed on the long side faces of the cells 5 and may be pressed against the cells 5 by the spacer portion 12.

Figure 7:
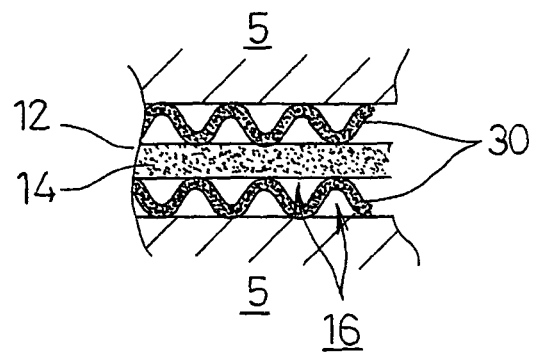
FIG. 7 is a cross-sectional plan view enlarging part of a third modified example of the same embodiment.

Further, the spacer portion 12 may be formed of a simple flat connection plate 14, and corrugated, continuously ridged, or square-waved heat dissipation fins 30 having appropriate strength and rigidity may be fixed on the long side faces of the cells as shown in FIG. 7, the recessed parts of the heat dissipation fins 30 forming the cooling medium passages 16.

Next, another embodiment of the battery pack of the present invention is described with reference to FIG. 8 to FIG. 10. Elements that are the same as those of the above-described embodiment are given the same reference numerals and will not be described again. The difference only will be described.

Figure 8:
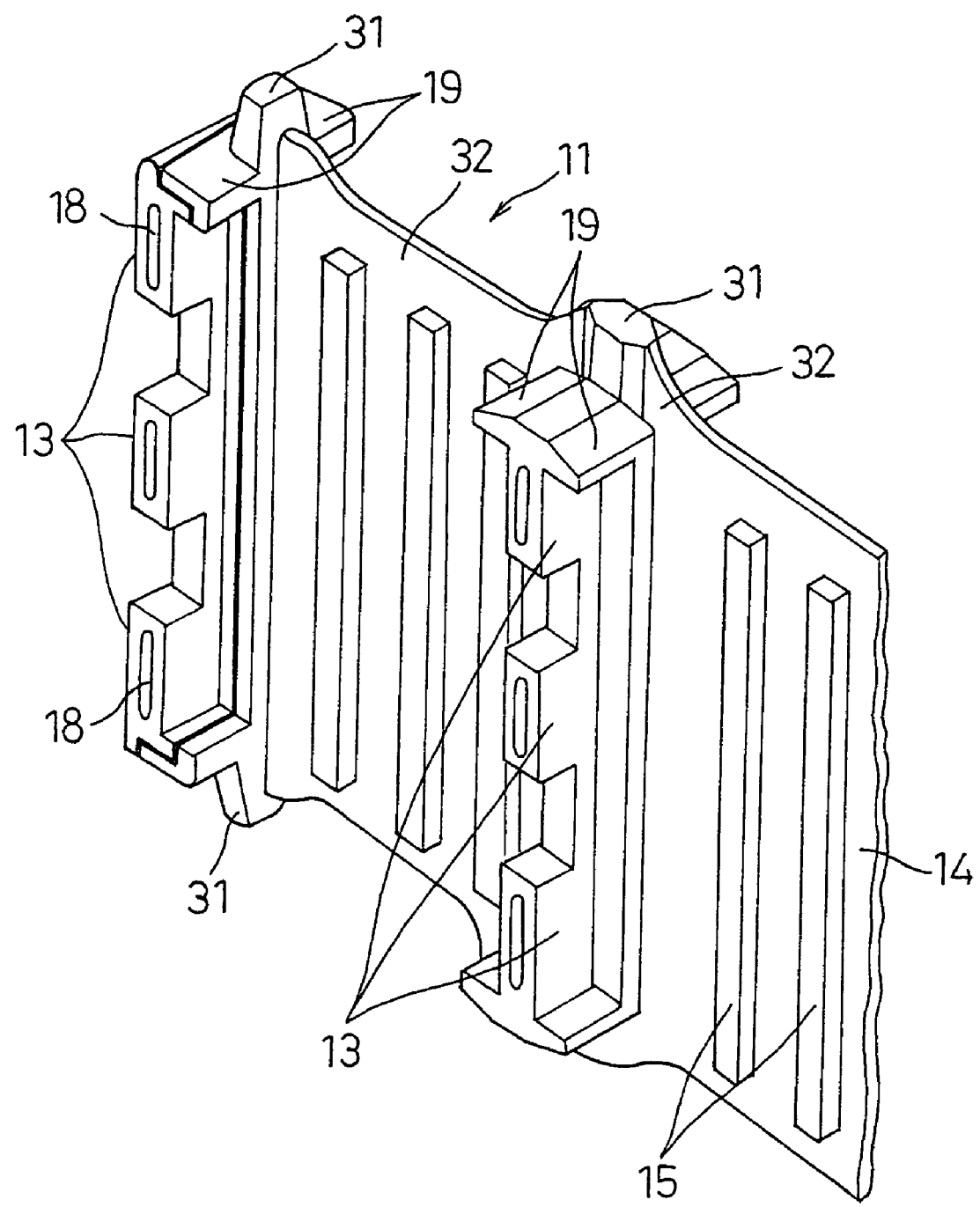
FIG. 8 is a perspective view of a holder in another embodiment of a battery pack of the present invention.

In this embodiment, as shown in FIG. 8, the holder 11 has support projections 31 at the top of the upper holder portion 13 and at the bottom of the lower holder portion 13 instead of the support portions 20 of the above-described embodiment. The connection plate 14 is extended upward and downward between each two support projections 31 to form reinforcing ribs 32 for reinforcing the support projections 31. While both ends of the reinforcing ribs 32 are connected to the support projections 31, the middle portions are dented so as to form passages of the cooling medium.

Figure 10:
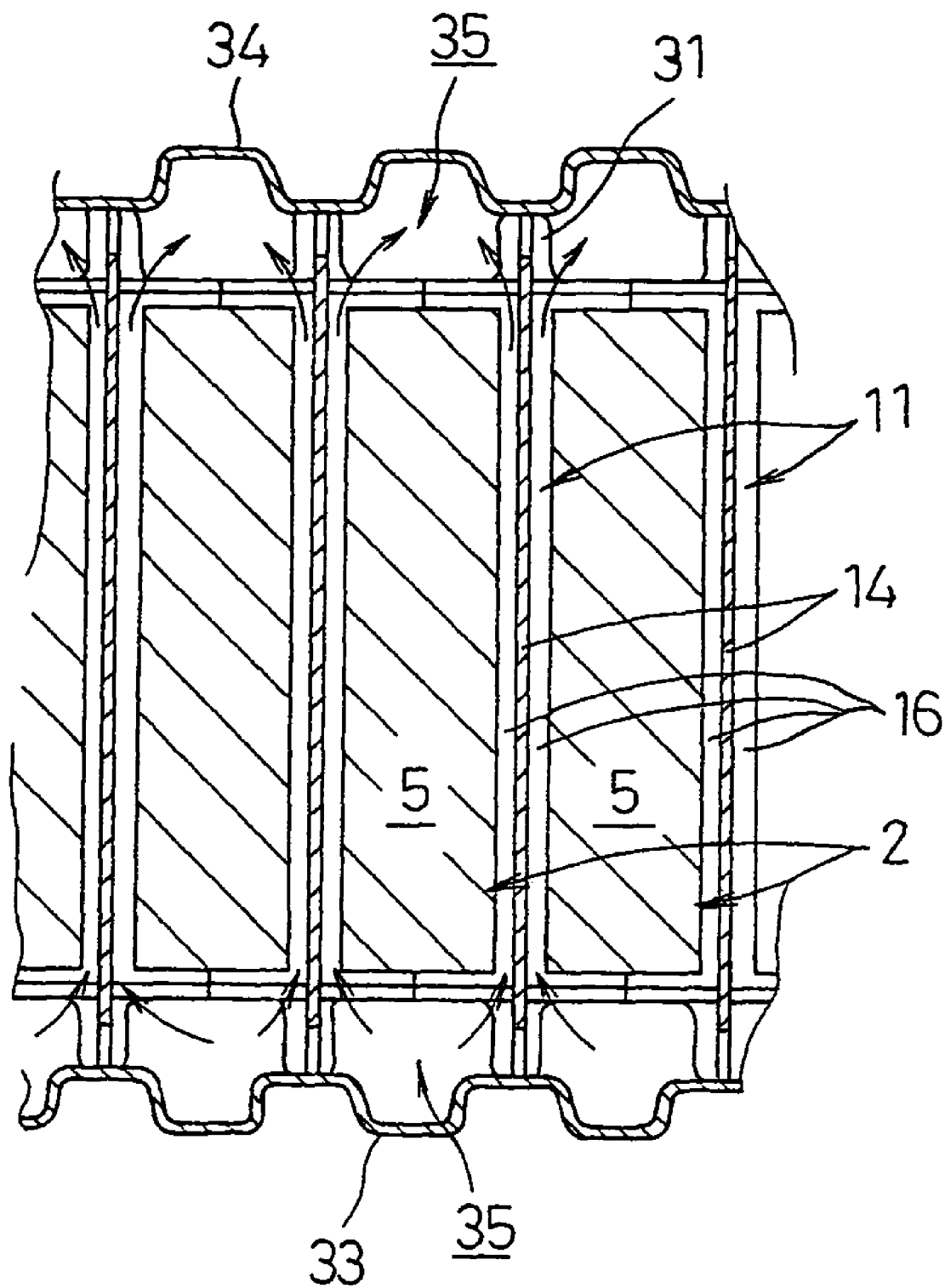
FIG. 10 is a longitudinal cross-sectional side view showing part of the same embodiment.

As shown in FIG. 9 and FIG. 10, the battery pack 1 is entirely covered by a lower case 33 forming a supply hood of the cooling medium and an upper case 34 forming a discharge hood. The support projections 31 of the holders 11 are engaged with these lower case 33 and upper case 34 so that the battery pack 1 is supported by the lower case 33 and the upper case 34 with passages 35 for distributing the cooling medium being formed in the upper and lower parts of the battery pack 1. Beads are formed on the upper and lower surfaces of the lower case 33 and the upper case 34 to secure surface strength, and the support projections 31 are engaged with the beads. The mating parts 36 of the lower case 33 and the upper case 34 are placed upon a support member 37 and fixed using a bolt 38 or the like.

According to this embodiment, the battery modules 2 are supported by the lower case 33 and the upper case 34 covering the battery pack 1 via the holders 11. Moreover, the support projections 31 form distribution passages 35 between the lower ends of the holders 11 and the lower case 33 and between the upper ends of the holders 11 and the upper case 34. The distribution passages 35 are the space for supply and discharge of the cooling medium to and from the cooling medium passages 16 between the battery modules 2. Thus the battery pack 1 is installed with a simple and inexpensive configuration.

While the cells 5 of the battery modules 2 have metal cases and the spacer portions 12 of the holders 11 are made of an insulating material in the above-described embodiments, the present invention may of course be applied to other configurations in which the cell cases are made of synthetic resin, or have a synthetic resin layer at least on their outer surfaces. The spacer portions forming the cooling medium passages 16 in that case may be formed of a metal having high heat conductivity, instead of the insulating material.

While the cases of the cells 5 of the battery modules 2 are prismatic having a rectangular cross section in the above-described embodiments, they may be prismatic cases having an oval cross section.

While the holder 11 having the spacer portion 12 and holder portions 13 for retaining the cells 5 is used in the above-described embodiments, spacer portions having only through holes for passing the connecting members 4 may be interposed between the battery modules 2.

INDUSTRIAL APPLICABILITY

As described above, the battery pack of the present invention has a plurality of parallel arranged battery modules, each consisting of a plurality of cells electrically connected in series and coupled together in one piece with gaps formed therebetween, and a restraining tool having connecting members extending through the gaps at both ends of the battery modules and between two given cells. Expansion of the cases due to internal pressure of the cells or expansion of the elements for electromotive force is restrained by tension of the connecting members extending between the cells. Secure restraint is thus achieved using a restraining tool having relatively low rigidity. Accordingly, the present invention is suited to achieve weight and cost reductions of battery packs.

The invention claimed is:

1. A battery pack, comprising:
   a plurality of parallel arranged battery modules, each battery module having a plurality of cells formed by encasing elements for electromotive force in prismatic cases, the cells being electrically connected in series and coupled together in one piece with gaps formed between opposing side faces of the cells; and
   a restraining tool having connecting members extending through the gaps at both ends of the parallel arranged battery modules and between two given cells,
   the connection terminals that electrically connect the cells with each other protruding from respective opposing side faces of the cells that have the gaps formed therebetween, and
   the restraining tool comprising end plates arranged at both ends in an alignment direction of the battery modules, and both ends of the connecting members being coupled to the end plates.

2. The battery pack according to claim 1, wherein components for forming cooling medium passages between side faces of the cells are provided between the parallel arranged battery modules.

3. The battery pack according to claim 2, wherein the components forming the cooling medium passages are formed of separate spacer portions independently of the battery modules.

4. The battery pack according to claim 2, wherein the cell cases are made of a metal and the components forming the cooling medium passages are insulating spacer portions provided independently of the battery modules.

5. The battery pack according to claim 3, wherein the spacer portions have holder portions that fit in the gaps between the cells for positioning the cells.

6. The battery pack according to claim 3, wherein the spacer portions have projections that abut on the long side faces of the cells to form the cooling medium passages.

7. The battery pack according to claim 6, wherein heat dissipation fins facing the cooling medium passages are provided on the long side faces of the cells.

8. A battery pack comprising:
   a plurality of parallel arranged battery modules, each battery module consisting of a plurality of cells formed by encasing elements for electromotive force in prismatic cases, the cells being electrically connected with each other in series by connection terminals protruded on side faces thereof;
   holders for the battery modules disposed between parallel arranged adjacent battery modules;

end plates arranged at both ends in an alignment direction of the battery modules; and connecting members extending through gaps at both ends of the battery modules and between two given cells and coupling both end plates together, wherein each holder includes a spacer portion forming a cooling medium passage between side faces of the cells and holder portions provided on both sides of the spacer portion at locations corresponding to both sides of each cell for engaging with and retaining the cells, and the connection terminals of the cells are protruded on respective short side faces of the cell cases, the gaps that make up the battery module are provided between the short side faces, and the cooling medium passages are formed between the long side faces of the cells.

9. The battery pack according to claim 8, wherein the holder portions of the holders engage with generally half or less of the width of the short side faces of the cells.

10. The battery pack according to claim 8, wherein the cell cases are made of a metal and the holders are made of an insulating material.

11. The battery pack according to claim 8, wherein the holder includes support portions at both ends, which are placed on support members, and one of the support portions is provided with a fixing bolt hole or screw hole.

12. The battery pack according to claim 11, wherein the support portions at both ends of the holders are formed with an engaging protrusion on one side and an engaging recess on the other side in which the engaging protrusion fits.

13. The battery pack according to claim 8, wherein the holder portions of the holders include support projections on the top and the bottom, which are engaged with an upper case and a lower case covering the battery pack.

14. The battery pack according to claim 8, wherein the spacer portions have projections that abut on the long side faces of the cells to form the cooling medium passages.

15. The battery pack according to claim 14, wherein heat dissipation fins facing the cooling medium passages are provided on the long side faces of the cells.

16. The battery pack according to claim 1, wherein the connecting members are arranged on both sides of each of the cells of the battery modules.

17. The battery pack according to claim 2, wherein heat dissipation fins forming the cooling medium passages are provided on the long side faces of the cells.

18. The battery pack according to claim 7, wherein the heat dissipation fins are resiliently pressed against the long side faces of the cells by pressure applied from the spacer portions forming the cooling medium passages.

* * * * *